May 14, 1963 P. D. WOLFE 3,089,187
MANUFACTURE OF IMPROVED THERMOPLASTIC PIPE
Filed May 6, 1960 3 Sheets-Sheet 3

INVENTOR
PAUL DILLON WOLFE
BY Earl L. Tyner Jr.
ATTORNEY

United States Patent Office 3,089,187
Patented May 14, 1963

3,089,187
MANUFACTURE OF IMPROVED THERMO-
PLASTIC PIPE
Paul Dillon Wolfe, Wilmington, Del., assignor to E. I.
du Pont de Nemours and Company, Wilmington, Del.,
a corporation of Delaware
Filed May 6, 1960, Ser. No. 27,316
7 Claims. (Cl. 18—14)

This invention relates to a novel method and apparatus for the manufacture of thermoplastic pipe having improved mechanical properties.

It has been known heretofore to manufacture thermoplastic pipe by extrusion. Such pipe has proved to be extremely valuable for many applications. Pipes made from thermoplastics are not subject to many of the types of corrosion which destroy metal pipes, and in this respect they resemble clay or ceramic pipes, but have the advantage over the latter of lightness of weight and resistance to impact.

One drawback of thermoplastic pipes which has seriously limited their use has been relatively low bursting pressure as compared with metal pipe. Another drawback encountered with some thermoplastics is their embrittlement at low temperatures which may make the outdoor use of such pipes impossible in many locations subjected to low winter temperatures.

It has also been known that the mechanical properties of thermoplastics can be improved by molecular orientation. Molecular orientation is produced by the mechanical deformation of thermoplastics, in particular partly crystalline thermoplastic resins. Generally speaking, greater degrees of molecular orientation and greater improvements in properties are produced by greater deformations.

Orientation may be classified as uniaxial or biaxial. If the extension of the plastic material, usually in the form of a sheet, occurs in a single direction, it is then described as uniaxial orientation. If the extension of the plastic material occurs in two directions the resultant orientation is described as biaxial orientation.

In uniaxial orientation, the linear molecules which are characteristic of thermoplastic polymers tend to be aligned parallel with each other and in the direction of the extension. Such molecular orientation greatly enhances the strength of the thermoplastic in the direction of orientation. On the contrary however, the strength of the plastic at right angles to the direction of orientation is decreased. Such uniaxial orientation is therefore primarily of importance and utility in such structures as tapes, textile fibers, and the like, where the stresses encountered in use are mainly along the length of the structure, which naturally is also the direction of extension.

Biaxial orientation is produced by the application of stresses to a plastic sheet or the like in two directions, usually mutually perpendicular directions. The linear molecules of the thermoplastic are substantially aligned in a plane defined by the biaxial extension of the system, but lie at random within that plane. Generally speaking, the strength of biaxially oriented thermoplastic is improved in both directions simultaneously, although the improvement in such properties as tensile strength for a predetermined extension is less than is the case wherein the same degree of uniaxial extension is imparted to the same plastic. It will also be evident that in a biaxially oriented system the change in properties need not be identical in the two directions of deformation, but that the improvement in strength can be controlled in these two directions by controlling the degrees of deformation.

The requisite mechanical deformation required to produce orientation is generally produced either by direct drawing, which is a process particularly applicable to the production of oriented textile fibers or like structures, or by rolling. Rolling processes have been applied heretofore to the production of thermoplastic tapes, films, sheets, etc.

In general, in the case of rolling, the main extension is in the direction of rolling and results in a uniaxial elongation in the rolling direction, however, compressive forces between the rolls also produce a biaxial stress system and, thus, although rolled shapes are oriented substantially uniaxially, some biaxial orientation is also produced. The relative amounts of biaxial and uniaxial orientation may be varied by varying the degree of deformation produced by the rolling process, a lesser degree of deformation tending to increase the relative amount of biaxial orientation.

It is an object of the present invention to produce semi-crystalline thermoplastic pipes having biaxial orientation. Another object of this invention is to produce oriented thermoplastic pipes having controlled degrees of biaxial orientation in the axial and hoop directions, and more particularly having a tensile strength measured in the hoop or circumferential direction which is twice the tensile strength measured in the axial direction. This combination represents the optimum combination for burst-strength of unconfined pipe.

A further object of this invention is to produce biaxially oriented thermoplastic pipe by a continuous process which is capable of being applied to the pipe leaving an extruder, thus permitting the convenient manufacture of any desired length.

Yet another object is to produce thermoplastic pipe having improved low temperature brittleness. An additional object is to provide a process for the manufacture of oriented thermoplastic pipe which will yield a product of great dimensional uniformity. Other objects will become apparent hereinafter.

The above objects are achieved by extruding a thick-walled pipe stock of the chosen partly-crystalline thermoplastic material, and passing the pipe stock through a rolling mill to simultaneously increase the diameter and length of the stock by predetermined quantities. The pipe stock is milled by the action of a plurality of substantially conical rolls operating epicyclicly about a flare in a mandrel within the pipe, the rotation of the rolls being such that the thermoplastic material is reduced in thickness per pass of each roll by an amount from about 0.1% to 10% of the total reduction in thickness. The mandrel must be maintained at a uniform temperature well below the crystalline melting point of the thermoplastic material.

In the following discussion of this invention the deformation ratio in the axial direction is defined as the ratio of the final length of the tube divided by the initial length of the pipe stock. If the density of the plastic material is assumed to be constant (which is experimentally the case within the third significant figure for the many polymer types that have been studied) this ratio is equal to the ratio of the cross-sectional area of the pipe stock divided by the final cross-section of the product.

The deformation ration in the hoop direction is defined as the ratio of the initial wall-thickness of the pipe stock to the final thickness divided by the axial orientation ratio.

The above definitions enable measurements to be made of the degree of deformation based on the diameter and wall thicknesses of the stock before orientation, and of the finished product. These definitions are also in accord with the customary definition of deformation ratio in sheet stock, namely the ratio of the final length divided by the initial length.

When sheet material is rolled, the principal external stresses occur in a plane through the axes of the rolls and lead to a substantially uniaxial deformation of the plastic material. In addition, the compressive forces of the rolls generate a biaxial stress system, so that some biaxial orientation is attained. The actual limits on the reduction in thickness per pass of the roller are also derived from practical considerations. If the roller rotating about the mandrel rotates slowly with respect to the rate of feed of the pipe stock, the helical rolling pattern will be distorted and will not produce the desired close approximation to true peripheral rolling. The resultant product will tend to be deformed, and non-uniform in thickness. The pressure needed to feed the stock also rises very rapidly when the mill is reduced in speed. The end result is too great a rolling reduction in thickness per pass, tending further to distort the tube. On the other hand, difficulties are encountered if the mill is rotated too rapidly with regard to the feed. It has been found that considerable amounts of heat are evolved in the rolling process which must be dispersed by uniform and efficient cooling of the mandrel. If the feed is stopped and the mill allowed to continue its rotation, even the high-melting thermoplastic materials such as polyamides are melted by the heat produced by rolling despite efficient cooling of the mandrel. Again from a practical viewpoint, it is necessary to manufacture pipe at a finite rate, and preferably at as great a rate as is possible consistent with the desired properties.

It has already been disclosed herein that the manufacture of pipe is attended by the evolution of heat. It is part of this invention to cool the mandrel, and particularly the flared section of the mandrel, to a temperature well below the melting point of the thermoplastic material. Moreover, it is also essential that the temperature of the conical flare be uniform with time, and uniform over the surface of the mandrel flare in order to obtain uniform dimensions of the product pipe.

With regard to the final diameter of the pipe, this is largely determined by the diameter of the widest part of the mandrel, although a small shrinkage, generally not more than 4 percent, and in many cases less than 4 percent, takes place after the rolled pipe leaves the mandrel. The shrinkage will depend on the plastic material involved, the amount of mechanical working and on the efficiency of the cooling. The degree of extension in the hoop direction may be readily controlled by the design of the mandrel, and by the diameters of the pipe stock employed.

The axial extension ratio may be varied, once the hoop orientation ratio has been determined, by the design of the rolls and mandrel, and may be adjusted over a reasonable range by axial displacement of the mandrel whereby the surface of the mandrel approaches or recedes from the rolls.

In practice, the hoop and axial extension ratios are not independently variable over an indefinite range by nature of the geometry of a tube. The theoretical limit is imposed by the fact that the minimum dimensions of the pipe stock is a solid billet of unoriented plastic. In this case, pipe of overall diameter D and wall thickness T may have axial extension ratios X and hoop extension ratios Y which are limited by the equation:

$$XY^2 = \frac{D}{T} - 1$$

Such properties as the tensile strength are not linearly related to the extension ratios, however, and hence the orientation ratios required to produce the optimum hoop/axial tensile strength ratio of 2 differ from polymer to polymer, and the maximum extension in each direction will correspondingly vary.

Again, the aforesaid maximum limits of extension are mainly of theoretical consequence, since it is necessary to start with a pipe stock, and preferably to have a mandrel through the unoriented stock, whereby the conical expanding section of the mandrel is maintained in juxtaposition with the rolls of the mill by tension, and therefore the actual degrees of extension which can be attained are yet more severely limited.

The invention will be better understood by reference to the accompanying drawings. In the drawings.

Figure 1:
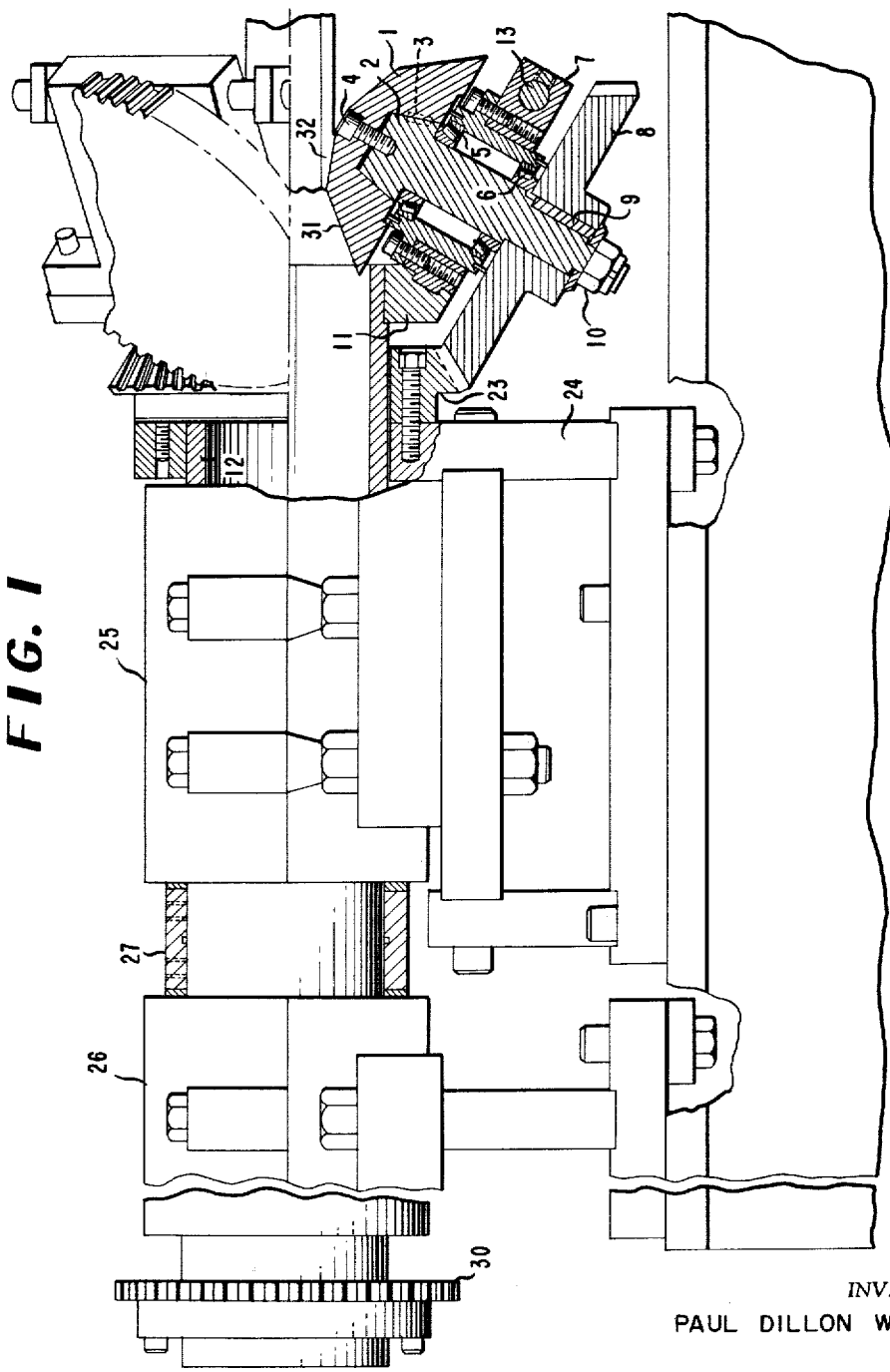
FIGURE 1 is a side elevation view, partly in cross-section, of a rolling mill (with the mandrel omitted for the sake of clarity) which is suitable for the practice of this invention.
Figure 2:
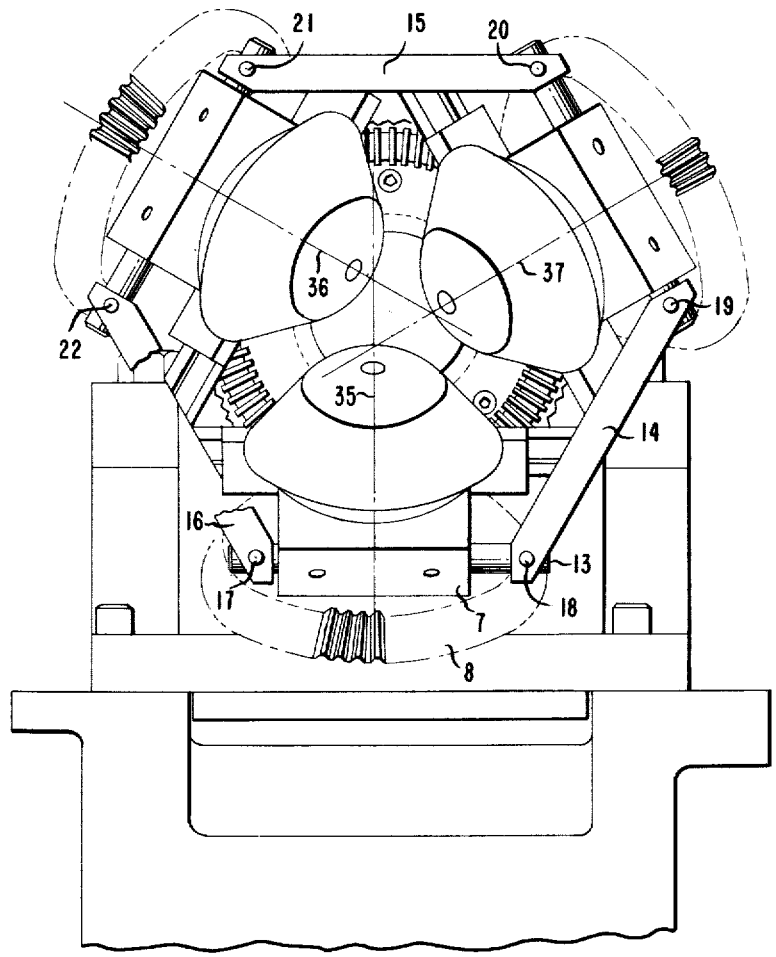
FIGURE 2 shows an end elevational view of the rolling mill of FIGURE 1.

Referring now to the accompanying drawings:

FIGURES 1 and 2 are an elevation and end view of a mill suitable for the practice of this invention. In the drawings like parts are numbered alike. The roll 1 of the mill is securely attached to its drive shaft 2 by key 3 and a screw 4. The shaft 2 rotates freely in roller bearings 5 and 6 which support the shaft and roll and are attached in turn to a frame 7. On the other side of the frame is located a bevel gear 8 which is rigidly affixed to the shaft 2 with the key 9 and the locking nut 10. The gear and roll assembly mounted on the plate 7 is adjustably located with a tongue and groove on the central plate 11 which is rigidly affixed to the hollow driving shaft 12. At the other end the plate 7 is supported by the rod 13, locking screws being provided to rigidly affix the rod 13 to the plate 7. Two other roll assemblies each identical with that described hereinabove are located at 120° from each other about the principal axis of the mill. The assemblies are supported by the common frame 11 and by bars 14, 15 and 16 which support the rod 13 and its equivalents, being secured to these bars by pairs of the taper pins 17, 18, 19, 20, 21 and 22. The bevel gear 8 (and its equivalents) rotate substantially epicyclicly about the fixed gear 23, which in turn is bolted to the bearing frame 24. The driving cylinder 12 is supported by the bearing 25 attached to the frame 24, and by a second bearing and frame 26, attached rearwardly of the bearing 25. Between the bearings 25 and 26 a thrust ring 27 is affixed to the hollow drive shaft 12, thereby supporting the rolls against axial thrust. A gear wheel 30 is also attached to the drive shaft 12 rearwardly of the second bearing 6. This gear wheel provides a means whereby the mill may be driven by a variable speed electric motor and gear train (not shown in FIGURE 1). When the shaft 12 is rotated, the rolls and gear assembly are driven epicyclicly about the central gear 23.

The rolls 1 (and its equivalents) have two conical surfaces 31 and 32. The bulk of the reduction in thickness is effected by the rolling action of the roll surface 31 against the substantially conical surface of the mandrel (not shown in these diagrams). The second surface 32 provides an initial gripping action at the cylindrical portion of the forming mandrel and has been found to assist the operation of the apparatus.

For the sake of simplicity in the following, it will be assumed that the axis of the rolls, spindles and gears intersect the principal axis of the apparatus. In this case, the action of the rolls may be understood by connecting a cone defined by the line of contact of the centrally fixed gear with an apex determined by the point of intersection of the axis of the planetary rolls with the principal axis of the entire machine. The planetary system is thus a system of cones rolling on this central cone, the apices of all the cones being coincident, and the planetary cones being defined by their respective gears. If the surface of the rolls lies in the surface of these rolling planetary cones, then the action is purely a rolling motion. However, if the surface of the rolls lies on a cone having the same apex as the rolling planetary cone but having a greater apical angle, then a shearing component of force at right angles to the line of contact is introduced which tends to feed the thermoplastic under the rolls. This situation may be termed "over-travel," signifying that the surface of the cone is driven faster than the velocity required for true rolling contact. A small amount of over-travel is of decided advantage in the rolling of many thermoplastic tubes. The rolls shown in FIGURES 1 and 2 are constructed to produce such over-travel.

The axes of the rolls are laterally displaced so that they do not intersect on the axis of the mill but pass by the principal axis so that the least distance is from 1/10 to 1/1 of the diameter of the pipe stock from the principal axis. This introduces a component of force which tends to assist the introduction of the plastic stock into the rolls. The magnitude of the offset will not in general exceed the radius of the pipe stock.

A feature of the rolls, which is of assistance to the feeding action of the offset, is the presence of a second conical surface whereby a slight rolling takes place prior to the contact of the pipe stock with the flared portion of the mandrel. The axial force required to push the stock through the mill is greatly reduced by this feature in conjunction with the offset.

Figure 3:
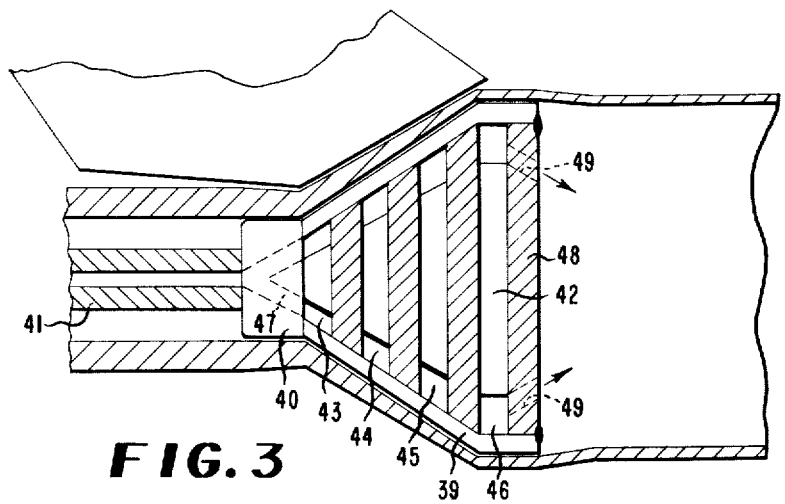
FIGURE 3 is a longitudinal cross-sectional view showing the construction of a water cooled mandrel suitable for use in the practice of this invention.

Turning now to FIGURE 3, there is shown a view in section of a mandrel which may be employed in the practice of this invention in conjunction with the rolling mill shown in FIGURES 1 and 2.

The mandrel consists of an outer shell, 39 having substantially the form of a truncated cone which merges into a cylindrical section 40. The mandrel is supported by a thick-walled metal tube 41 to which it is attached. The inner core is a conical plug 42 into the surface of which is cut a series of deep circular grooves, 43, 44, 45, and 46. A slot is cut in each of the lands separating these grooves, adjacent lands being slotted at 180° to each other so that a tortuous path is provided beneath the surface of the mandrel shell. Inlets 47 connecting the first channel 43 to the tube 41 extend through the outer shell and outlets 49 extend through the final land 48 to the last groove 46 to provide an exit for the cooling water.

When a mandrel is employed in line with an extruder using a cooled mandrel at the die of the extruder on which the thermoplastic is extruded in the form of a tube, it may be desirable to pass the water into the mandrel through the annular space found between the supporting rod and the inner surface of the tube.

Figure 4:
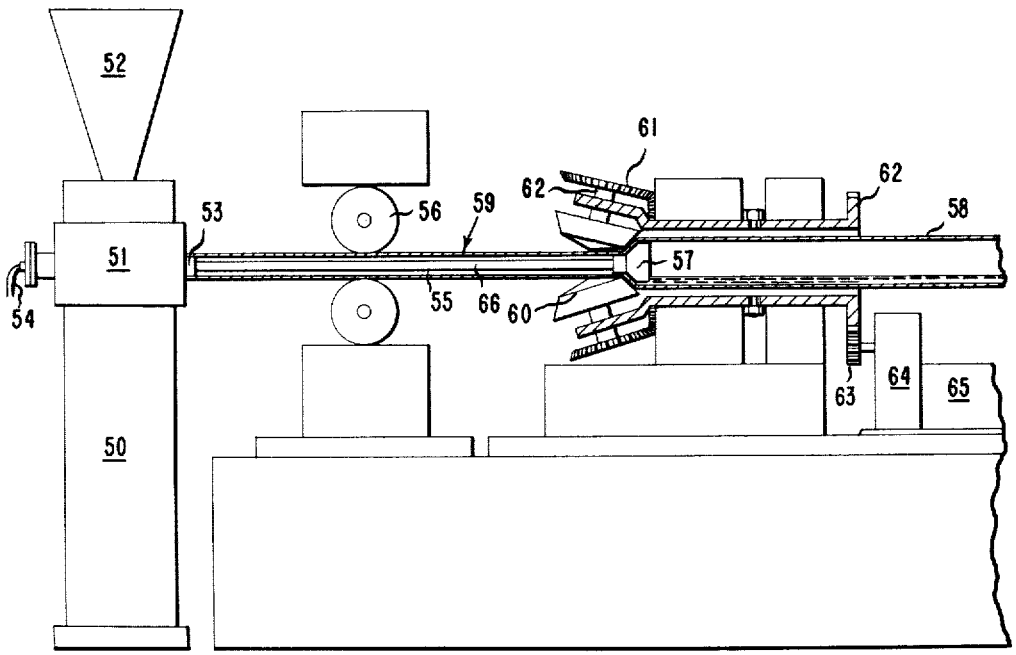
FIGURE 4 is an assembly view showing one embodiment of this invention by means of which thermoplastic pipe may be extruded and rolled to produce extremely long lengths of pipe in a unified operation.

Referring to FIGURE 4, an assembly view of a rolling mill coupled with an extruder is shown. The outlet end of an extruder 50 is shown fitted with a cross-head 51. Thermoplastic material is introduced in the hopper 52 of the extruder and plasticated by the rotation of an extrusion screw and thence urged forward into the cross-head by the action of the screw. Within the cross-head, an annular passageway is defined by the outermost part of the die and by a water-cooled inner core 53. Cooling water is supplied to the core by the tube 54. The exit water leaves by the annular space between the mandrel and the extrudate 55 and serves to cool the flared, central mandrel of the rolling mill. The thermoplastic is thus extruded as a tube, having a less diameter, and having a greater wall thickness, than the desired end product.

This method for the manufacture of tubing from thermoplastics produces stock having a greatly improved surface over stock produced by prior art methods, and has been described in greater detail in a copending application (A.D. 2541). In addition to being more readily adapted to the process of the present invention than prior art processes, the improved inner surface is highly desirable for use with the rolling technique, since a particularly good finish on the end product may be obtained when such stock is used. By contrast, prior art processes for the extrusion of pipe stock tend to produce tubing with a rough inner surface containing flaws which are magnified by the rolling process.

After the stock leaves the extruder, it is gripped and urged forward by rolls 56 towards the tube mill. The tube mill comprises the water cooled mandrel 57 which is supported from the center of the cooled die cone by the rod 66. The cooling water, somewhat heated from the internal extrusion core, flows through the annular passageway formed between the rod and the plastic extrudate 59, the thence through and around the flare in the mandrel and out via the product tubing 58, thus serving to cool the mandrel.

Lubricants may be supplied to the outer surface of the pipe as it passes into the mill, but this is not an essential feature of the process.

The stock 59 is urged into the mill by the same gripping device which serves to withdraw the tube from the extruder. The rolls 60, which serve to reduce the stock to the desired thickness, are driven by the epicyclic gear system 61, the rolls being driven by the rotation of the shaft 62, which, in turn, is driven by the gear train 63 and 64, connected to a suitable power source such as a variable speed electric motor 65.

With regard to the dimensions of the mandrel, the diameter is clearly determined by the diameter of the desired product and by the roller system. The mandrel is substantially conical in shape when conical rolls are employed. It has been found that the included angle of the mandrel should be about 3° greater than the included angle of the rolls in order to obtain good results. An included angle of about 45° has been found to give excellent results, but the included angle may be as little as 20° or as great as 70° for various embodiments of this invention. The angle is governed in part by the requirement that the reduction in thickness per pass of each roll is small so that a substantially biaxial force system is established. The reduction in thickness per revolution is given by the expression:

$$\text{Reduction/revolution} = \frac{(\Delta t)(f)}{R.L}$$

and the reduction per pass of each roll is obtained by dividing this expression by the total number of rolls. Where $\Delta t$ is the total reduction in overall thickness of the pipe stock in inches, $f$ is the feed of the stock in inches per minute, R is the revolutions per minute of the rolling head and L is the axial length of the flare of the mandrel in inches. The rolls are preferably offset so that their axes do not intersect the axis of the mill. It has been found that the best results are obtained where the least distance between rolls and mandrel decreases lineally with distance through the mill. Thus, where conical rolls are employed with a mandrel of 45° angle the mandrel having a maximum diameter of 2.195" and a minimum of 1.180", and the axis of the rolls were displaced 5/8" from the principal axis, it was found that the surface of the mandrel cone should be concave, with a radius of curvature of 6", by geometrical construction based on scale drawings.

The temperature of the mandrel must remain uniform in order to maintain a uniform product. However, it is preferred that the mandrel be heated to a temperature of about 60° C. for most thermoplastic materials. It has been found that a sharp reduction in the power requirements for rolling and an improvement in the quality of surface in the finished tubing takes place as the temperature of the mandrel is raised to about 60° C., the exact temperature varying somewhat with the plastic. Above a mandrel temperature of about 60° C. the power required to drive the mill remains substantially unchanged until the crystalline melting point is approached. It is essential that the mandrel temperature be kept well below the crystalline melting point of the thermoplastic material which is being fabricated in order to prevent melting of the material by the mechanical work supplied. Generally speaking, the cooling fluid supplied to the mandrel should be kept at least 50° C. below the crystalline melting point of the polymer.

The following examples of the application of this invention are intended by way of illustration and are not to be understood as defining the limits of this invention.

EXAMPLE I

*Fabrication of Biaxially Oriented Pipe From Polyoxymethylene Resin*

The polymer employed in this example was a polyoxymethylene resin characterized by a number average molecular weight greater than 15,000 and a rate constant for thermal degradation at 222° C. of less than 1% by weight per minute, as described by R. N. McDonald in U.S. Patent No. 2,768,994 issued October 30, 1956.

Pipe stock was extruded having an internal diameter of 1.185" and an outer diameter of 1.615", and a wall thickness of 0.215" using the cooled mandrel technique described in the copending application (A.D. 2541). The billet was passed through a rolling mill substantially as described hereinabove and as shown in FIGURES 1, 2, and 3 of the appended drawings. The flared section of the mandrel was 1.593" in axial length and had a diameter of 1.180" at the smaller end and an outer diameter of 2.195" at the larger end. The conical surface of the mandrel had an included angle of 31° for a distance of 0.485", beginning at the smaller end of the conical surface, and an included angle of 40° for the rest of the flare, thereby conforming closely to a concave surface of radius 6", which was determined to be ideal for the rolls of the mill. The axes were offset by ⅝" from the center line of the mill, thus providing assistance to the feeding device. The mandrel was cooled internally with a rapid stream of water between 5–10 gallons/minute maintained at a temperature of approximately 60° C. The mandrel was adjusted to the desired gap by a screw adjustment on the tension bar supporting the flared head. The head was screwed in until it was in contact with the rolls, then retracted to give a minimum axial gap of 0.110". The stock was fed into the mill at a rate of 6½" per minute at a head speed of 144 r.p.m. The resultant pipe had a smooth, glossy inner and outer surface, had an outside diameter of 2.378", an inside diameter of 2.135" and a wall thickness of 0.120". The deformation ratios thus achieved were: axial 1.11; hoop 1.61. In Table I, the properties of the resultant pipe are compared to those of pipe extruded in the same fashion to comparable dimensions, but not oriented by the rolling technique described above.

TABLE I

*Properties of Extruded and of Biaxially Oriented Polyoxymethylene Pipe*

| Property | Extruded | | Oriented | |
|---|---|---|---|---|
| | Axial | Hoop | Axial | Hoop |
| Yield Strength, p.s.i. | 9,600 | 8,100 | 8,500 | 14,000 |
| Ultimate Strength, p.s.i. | | | | |
| Percent Elongation | 30 | 20 | 60 | 50 |
| Impact strength by weight drop, ft. lbs., room temperature | 27 | | 67 | |
| Low temperature brittleness, ° C. | −28 | | −58 | |
| Burst strength, 45° C., in water: | | | | |
| 10 hours | 4,100 | | 5,600 | |
| 100 hours | 3,050 | | 4,300 | |
| 1,000 hours | 2,250 | | 3,400 | |

EXAMPLE II

*Biaxially Oriented Pipe From 66 Nylon (Polyhexamethylene-Adipamide)*

Pipe stock was fabricated from a high molecular weight extrusion grade polyhexamethylene adipamide. The mandrel fed with cooling water at 60° C., and some oil was supplied to the outside of the pipe stock as it was fed through the rolling mill. The experimental details were otherwise similar to the previous example. The dimensions of the initial billet or pipe stock were 1.170" internal diameter, 1.580" outside diameter and wall thickness 0.205". After expansion over the mandrel, the pipe had an internal diameter of 2.140", an outer diameter of 2.370" and a wall thickness of 0.115". The mandrel gap had been set as described hereinabove to a distance of 0.115". A feed of 10"/minute with 156 r.p.m. of rolling head was employed. The deformation ratios were, therefore, 1.13 in the longitudinal direction and 1.63 in the hoop direction.

In Table II, nylon pipe manufactured according to these directions and nylon pipe extruded to comparable dimensions but not rolled were found to have the following properties:

TABLE II

*Properties of Biaxially Oriented Pipe of Polyhexamethylene Adipamide*

| Test | Extruded | | Oriented | |
|---|---|---|---|---|
| | Axial | Hoop | Axial | Hoop |
| Yield Strength, p.s.i. | 6,000 | | 5,500 | 15,000 |
| Burst Strength, p.s.i., 45° C., in water: | | | | |
| 10 hours | 3,200 | | 5,500 | |
| 100 hours | 2,700 | | 5,300 | |
| 1,000 hours | 2,400 | | 5,000 | |
| Impact Strength by Weight Drop Test (ft. lbs.) 0° C. | 70 | | 126 | |
| Low Temperature Brittleness, ° C. | −34 | | −71 | |

EXAMPLE III

*Biaxially Oriented Polypropylene Pipe*

Polypropylene having a melt index of 0.39 as measured by ASTM method D–1238–52–T was extruded in the form of a billet of internal diameter 0.955", 1.344" outside diameter and 0.195" wall thickness. The pipe stock was rolled on a mandrel having a flare with a smaller diameter of 0.950", a larger diameter of 1.650", the length of the flare being 1.100", the mandrel was cooled internally by a stream of oil. Some oil was also added to the external surface of the polypropylene during its passage through the rolls. The final dimensions of the product were: outer diameter 1.825", internal diameter 1.610" and hence wall thickness of 0.107". The deformation ratio was thus 1.24 in the longitudinal direction and 1.46 in the hoop direction. The yield strength of unoriented pipe comparable in dimensions was found to be 4,300 p.s.i. in the axial direction and 3,150 p.s.i. in the hoop direction, a small amount of orientation being introduced by the extrusion. After orientation, the axial yield strength was found to remain at about 4,000 p.s.i. but the hoop yield strength increased to 5,800 p.s.i. The low temperature brittleness was found to be +18° C. in the unoriented sample, but in the oriented material was found to be −16° C.

The process of the present invention may be modified in many respects, for example, the diameter of the stock may be increased by passing the stock through two or more mills in succession. It is also contemplated to employ tension on the stock in order to effect tensile as well as compressive extension, and to pressurize the stock and product tube with a chemically inert gas in order to assist the progress of stock through the mill.

The invention may be applied to thermoplastics containing small amounts of additives such as mold releases, anti-static agents, bacteriostatic agents, antioxidants, ultra violet screening compounds, dyes, pigments and the like. Filled compositions may also be fabricated by this invention, but, in general, the difficulty of processing increases with increasing concentrations of filler and with the nature of the fillers. Fibrous fillers, such as glass roving or asbestos greatly increase the difficulty of the orientation process. Moreover the improvement effected by orientation is less than with unfilled materials. Nevertheless, it has been found possible to orient polyoxymethylene containing 20% by weight of glass fibers by the rolling process of the present invention.

In general, the rolling mill may have any number of rolls, but preferably should have three rolls, since such an arrangement has a self-centering effect that is particularly conducive to the formation of uniform pipe. However, it will be realized that when large diameter pipe is made, and especially when considerable reduction in thickness is required, it may be more convenient to employ a larger number of rolls in order to achieve the requisite degree of working with the minimum rotational speed.

It will likewise be evident that very many different methods of forming pipe stock may be employed. For example, the pipe may be cooled from the outside inwardly using a forming box, pressure may be applied from the inside by pressurizing the pipe with an inert gas in order to promote thermal contact between pipe and box.

With regard to the polymer which may be employed for the manufacture of pipe, any thermoplastic may be employed. Such materials are characterized by essentially linear molecules as distinguished from 3-dimensional networks which characterize thermosetting materials. Such linear molecules may be oriented by mechanical deformation. The response of the mechanical properties of linear polymers to mechanical deformation is, however, variable. Generally speaking, highly crystalline polymers are more responsive than non-crystalline polymers. Examples of the types of thermoplastics suitable for use in this invention are: Polyethylene, including branched polyethylenes such as are made with free radical catalysts at high temperatures and pressures, and the so-called linear polyethylene having a density generally greater than 0.945. Polypropylene, particularly the partly-crystalline isotactic material made using titanium trichloride activated with metal allyls, and like catalysts known in the art, copolymers and terpolymers of ethylene and the like with 1-olefins including propylene, butene, pentene, hexene, octene, decene, dodecene, hexadecene, octadecene, 2 methyl pentene, norbornene, styrene, divinyl benzene, diallyl and the like. Polyamides such as polyhexamethylene sebacamide, also polycaprolactam, and copolymers of mixed amines and acids, polycarbonates and especially polyaryl carbonates. Polyoxymethylene resins, polyesters such as polyethylene glycol terephthalate, and like thermoplastic materials.

Many other modifications of this invention will be readily apparent to those skilled in the art.

The process of this invention is greatly superior to prior art processes for the stretching of plastic tubing to produce orientation.

When tubing is expanded by tensile forces, the stress concentrates at the thinnest part of the walls, which, in consequence, stretch to a greater extent than the thicker part of the walls. Irregularities become more pronounced and the tubular product tends to be non-uniform in cross section. On the contrary, in the rolling process, the greatest stress concentration takes place at the thickest point of the walls, and hence the rolling process tends to produce a more uniform product. These advantages become pronounced when thick-walled products such as pipe are oriented, and high pressures are involved.

Another feature of the invention is that high pressures such as are required to inflate thick-walled billets with small internal bores are not required. Unlike an inflation process, the force required is simply a function of wall thickness, and not of the diameter of the pipe, as in the case of tensile forces applied with fluid pressure. Thus, it is possible to manufacture pipe from smaller diameter thick-walled stock, thereby achieving greater mechanical deformation. Complementing this advantage is the fact that very much greater mechanical deformation can be attained in rolling than in stretching before rupture of the plastic takes place.

Another significant advantage is that in the tube rolling process, considerable kneading of the plastic takes place at relatively high temperatures, and that the resultant products, in general, have better dimensional stability without heat treatment than do oriented pipes made with tensile forces.

I claim:

1. A process for the manufacture of biaxially oriented pipe of a partly crystalline thermoplastic material which comprises extruding a plasticated thermoplastic in the form of a thick-walled pipe stock, cooling said pipe stock from the interior, withdrawing said stock from said extruder and urging said stock over a flared mandrel while simultaneously reducing the thickness of said stock by the compressive rolling action of a plurality of rolls rotating substantially epicyclicly about the said stock as it passes over said mandrel, the reduction in wall thickness per pass of each roller being between 0.1% to 10% of the predetermined total reduction in thickness, and continuously cooling the interior of said pipe during said rolling to a temperature substantially below the crystalline melting point of said thermoplastic.

2. A process for the manufacture of biaxially oriented pipe of a partly crystalline thermoplastic material which comprises extruding a plasticated thermoplastic in the form of a thick-walled pipe stock, cooling said pipe stock from the interior, withdrawing said stock from said extruder and urging said stock over a flared mandrel while simultaneously reducing the thickness of said stock by the compressive rolling action of a plurality of conical rolls rotating substantially epicyclicly about the said stock as it passes over said mandrel, the reduction in wall thickness per pass of each roller being between 0.1% to 10% of the predetermined total reduction in thickness, and cooling the mandrel to a temperature in the range between about 60° C. and a temperature about 50° C. below the crystalline melting point of said partly crystalline thermoplastic polymer.

3. The process of claim 1 wherein the said thermoplastic polymer is polyoxymethylene.

4. The process of claim 1 wherein the said thermoplatstic polymer is polyamide.

5. The process of claim 1 wherein the said thermoplastic polymer is polypropylene.

6. An apparatus for the manufacture of pipe from thermoplastic material which comprises, in combination, an extruder, a crosshead attached to the said extruder, a die attached to the said crosshead, a core partly within the said die, supporting means attached to the said core, a head flared outwardly away from said extruder attached to said supporting means, conical rollers spaced about the said flare, means to drive the said rollers substantially epicyclicly about the said flared head, means to pass cooling fluid in contact with part of the cone of said die, and thence into the annular space between said support and said mandrel, and thence through the said flare of said mandrel.

7. An apparatus for the manufacture of pipe from thermoplastic materials which comprises, in combination, an extruder, a crosshead attached to the said extruder, a die attached to the said crosshead, a core partly within the said die, supporting means attached to the said core, a flared head attached to the said supporting means, a plurality of conical rollers spaced about the said flare, the gap between the said rollers and said flare linearly decreasing at an angle of about 3°, means to drive the said roller substantially epicyclicly about the said mandrel and means, in turn, to cool the said core and said flare.

References Cited in the file of this patent
UNITED STATES PATENTS

| | | |
|---|---|---|
| 1,950,929 | Olson | Mar. 13, 1934 |
| 2,317,687 | Larchar | Apr. 27, 1943 |
| 2,708,772 | Moncrieff | May 24, 1955 |
| 2,945,258 | Houston | July 19, 1960 |

UNITED STATES PATENT OFFICE
CERTIFICATE OF CORRECTION

Patent No. 3,089,187                      May 14, 1963

Paul Dillon Wolfe

It is hereby certified that error appears in the above numbered patent requiring correction and that the said Letters Patent should read as corrected below.

Column 2, line 66, for "ration" read -- ratio --; column 6, line 4, and column 7, line 29, for "(A. D. 2541)", each occurrence, read -- S. N. 27,315, filed May 6, 1960 by William C. Bohres et al --; column 7, TABLE I should appear as shown below instead of as in the patent:

TABLE I

Properties of Extruded and of Biaxially Oriented Polyoxymethylene Pipe

| Property | Extruded | | Oriented | |
|---|---|---|---|---|
| | Axial | Hoop | Axial | Hoop |
| Yield Strength  psi) Ultimate Strength psi) | 9600 | 8100 | 8500 | 14,000 |
| % Elongation | 30 | 20 | 60 | 50 |
| Impact strength by weight drop ft. lbs., room temperature | 27 | | 67 | |
| Low temperature brittleness | -28°C. | | -58°C. | |
| Burst strength 45° C., in water    10 hours | 4100 | | 5600 | |
| 100 hours | 3050 | | 4300 | |
| 1000 hours | 2250 | | 3400 | |

Signed and sealed this 10th day of December 1963.

(SEAL)
Attest:

ERNEST W. SWIDER

Attesting Officer

EDWIN L. REYNOLDS

Acting Commissioner of Patents